United States Patent
Choquette et al.

(10) Patent No.: US 6,245,412 B1
(45) Date of Patent: Jun. 12, 2001

(54) FABRICATION OF EMBOSSED DIFFRACTIVE OPTICS WITH REUSABLE RELEASE AGENT

(75) Inventors: Steven J. Choquette, Gaithersburg, MD (US); Brigitte L. Ramos, Granville, OH (US)

(73) Assignee: The United States of America as represented by the Secretary of the Commerce, Washington, DC (US)

( * ) Notice: Subject to any disclaimer, the term of this patent is extended or adjusted under 35 U.S.C. 154(b) by 0 days.

(21) Appl. No.: 09/137,825

(22) Filed: Aug. 21, 1998

Related U.S. Application Data

(62) Division of application No. 08/687,048, filed on Aug. 1, 1996, now Pat. No. 5,861,113.

(51) Int. Cl.[7] .................................................... B32B 3/00
(52) U.S. Cl. ........................ 428/156; 428/333; 428/409; 428/447
(58) Field of Search .............................. 428/209, 156.333, 428/409, 447; 264/1.24, 1.31, 1.34, 1.36; 427/133, 163.2, 167

(56) References Cited

U.S. PATENT DOCUMENTS

| | | |
|---|---|---|
| 4,506,949 | 3/1985 | Knop . |
| 4,566,930 | 1/1986 | Uehara . |
| 4,716,063 | 12/1987 | Uehara et al. . |
| 4,957,663 | 9/1990 | Zwiers et al. . |
| 4,972,117 | 11/1990 | Adler et al. . |
| 5,011,623 | 4/1991 | Yoshinaga et al. . |
| 5,020,879 | 6/1991 | Kuzuta et al. . |
| 5,126,620 | 6/1992 | Haraga et al. . |
| 5,292,620 | 3/1994 | Booth et al. . |
| 5,377,044 | 12/1994 | Tomono et al. . |
| 5,438,448 | 8/1995 | Nishimura et al. . |
| 5,453,338 | 9/1995 | Suga et al. . |

OTHER PUBLICATIONS

Ramos et al., *Anal. Chem.*, vol. 68, pp. 1245–1249 (1996).
Wei et al., *Applied Optics*, vol. 15, No. 2, p. 289.
Roncon et al., *J. of Non–Crystl. Solids*, vol. 128, pp. 111–117 (1991).
Christensen et al., *I. SPIE*, vol. 1796, pp. 20–25 (1992).
Lukosz et al., *OPTICS Letters*, vol. 8, No. 10, pp. 537–539 (1983).

Primary Examiner—Bruce H. Hess
Assistant Examiner—B. Shewareged
(74) Attorney, Agent, or Firm—Millen White Zelano and Branigan

(57) ABSTRACT

A method for producing a plastic material containing a diffractive optic pattern therein including embossing a curable plastic material with a diffractive optic pattern by pressing the curable plastic material against a master having a diffractive optic pattern thereon which is coated with a thin layer of a fluorinated silane, having at least one fluorinated alkyl group bonded to an Si atom and at least one alkoxy or halide group bonded to an Si atom, as a release layer. Also, the master coated with the fluorinated silane and cured plastic, particularly epoxy resins, containing diffractive gratings prepared by the method, preferably on a substrate, such as a waveguide.

16 Claims, 2 Drawing Sheets

FABRICATION OF EMBOSSED DIFFRACTIVE OPTICS WITH REUSABLE RELEASE AGENT

This is a divisional of application Ser. No. 08/687,048 filed Aug. 1, 1996, now U.S. Pat. No. 5,861,113.

The invention is directed to a novel method for inexpensively and reproducibly preparing diffractive optics. By chemically modifying a commercial master or submaster diffractive optic, particularly a grating, with a very thin layer of a release agent it is possible to use the master or submaster to emboss replica gratings onto a variety of substrates having a curable plastic surface, particularly waveguides, and to reuse the master or submaster multiple times for such embossing. The invention is also directed to the master or submaster containing the thin layer of release agent and to the substrates containing the diffractive optics prepared by the process.

BACKGROUND OF THE INVENTION

Planar optical waveguides are an attractive tool for use in analytical chemistry and spectroscopy. A wide variety of inorganic and organic materials have been used to fabricate thin-film waveguides, and as a result, planar guides can be engineered for specific chemical applications. As the evanescent wave is easily accessed, a number of papers have addressed the use of planar waveguides for bio/chemical sensors. Attenuation, fluorescence, and interferometric sensors have been reported, as has the use of waveguides for enhanced Raman spectroscopy.

Unlike fiber optics, planar waveguides have been slow to be widely accepted due to the difficulty of coupling light into the waveguide. In the laboratory, prism coupling is the predominant method, followed by end fire and grating coupling. Prism coupling, which operates on the principle of frustrated total internal reflectance, and endfire coupling, which uses fiber optics or a lens to introduce light directly into the polished endface of the waveguide, are highly efficient methods, as typically 80% of the laser beam is coupled into the waveguide. The use of prisms and fibers does not damage the waveguide, and the various elements (prisms, fibers, and lenses) are reusable. They are impractical for routine use, however, as both coupling methods require expensive positioning equipment. Prism coupling is sensitive to environmental fluctuations and destroys the two-dimensional geometry of the planar waveguide. Diffraction or reflection gratings for light coupling into planar waveguides are more practical than prisms or fibers for routine use. Although the coupling efficiency observed with gratings is reduced, the two-dimensional nature of the guide is conserved and gratings are generally more robust than prisms. Furthermore, the coupled power is immune to environmental fluctuations because the grating is often embedded in the waveguide.

Grating couplers are commonly fabricated using techniques based on holography. This approach involves an exposure step using a single mirror which creates an interference pattern between two spatial halves of a laser beam. The exposed photoresist acts as a mask for chemical etching of the underlying waveguide or substrate to form a periodic grating structure. This process can be time consuming, since this method involves an exposure followed by a chemical etch. Blazed gratings require additional fabrication steps. The use of an embossing technique where the surface relief pattern of a master grating is pressed in to a suitable material may provide a fast and economical method to form grating couplers for routine use.

Several investigators have published methods to emboss gratings for waveguide applications. The earliest was Wei et al. (Wei, J. S.; Tan, C. C. "Coupling to film waveguides with reusable plastic gratings", *Appl. Op.*, 1976, 15, 289.) who used a thick (>100 $\mu$m) film of a polycarbonate that was poured onto a master grating. The polycarbonate film was subsequently peeled from the master grating and "stuck" on the waveguide surface. Although this method is easy, it is not amenable to mass production. Furthermore, reduced efficiency is observed due to the use of an extremely thick polycarbonate film and poor contact between the grating and the waveguide surface.

This was followed by the work of Lukosz (Lukosz, W.; Tiefenthaler, K. "Embossing technique for fabricating integrated optical components in hard inorganic waveguiding materials", *Opt. lett.* 1983, 8, 537–539) who embossed gratings into sol-gel glasses. Although this technique uses a master grating to impress a replica into a thin film guide, it is limited to sol-gel glass type waveguides. Furthermore, subsequent work (Roncone, R. L.; Weller-Brophy, L. A.; Weisenbach, L.; Zelinski, B. J. J. "Embossing gratings in sol-gel waveguides: pre=emboss heat treatment effects", *J. Non.Cryst. Solids* 1991, 128, 111–117) showed that the grating pattern was not uniformly transferred and that blaze (grating profiles) was distorted.

Christensen and Dyer (Christensen, D.; Dyer, S.; Herron, J.; Hlady, V. "Comparison of robust coupling techniques for planar waveguide immunosensors", Proc. SPIE, 1992, 1796, pp. 20–25) improved the embossing technique by coating the master grating with a vacuum deposited aluminum film. The grating pattern is replicated onto the waveguide surface with a UV curable epoxy. Because the aluminum film does not adhere strongly to the grating, it "releases" the master from the cured epoxy replicate. This type of grating replication technique can be applied to all waveguide types. The limitation however is that the master grating is not truly reusable, for each new grating embossed the aluminum release film must be reapplied to the master grating. Mass production, and the resulting economies of scale, are thus impossible.

SUMMARY OF THE INVENTION

An object of the invention is to provide a process for the production of diffractive grating structures onto a substrate, particularly optical waveguides. The gratings allow the in and out coupling of light into the waveguide or other substrate structure. The known methods for fabricating gratings, such as holographic exposure techniques, are time-consuming, expensive and not amenable to easy high volume production. This invention provides a process whereby gratings can be provided on substrates in an inexpensive and reusable manner such that single use sensors containing such gratings are much more economically feasible. The invention provides a master grating with a release surface which can be used for the embossing multiple gratings, for example up to several hundred, without the need for reapplication of the release layer. Further, inexpensive curable plastic materials, particularly epoxy resins, are used for forming the grating on the substrate.

Upon further study of the specification and appended claims, further objects and advantages of this invention will become apparent to those skilled in the art.

For achieving the above objects, the invention provides a method for producing a substrate with diffractive optics thereon comprising embossing into a curable plastic material contained on the substrate a diffractive optic pattern by pressing against the curable plastic material a master diffractive optic pattern which is coated with a thin layer of a fluorinated silane as a release layer, curing or otherwise hardening the plastic material and removing it from the master. Also, the invention provides a master diffractive optic comprising the master diffractive optic pattern, preferably on a substrate, which pattern is surface coated and modified with a fluorinated silane release agent. Further, the invention provides the product substrate with an embossed diffractive optic pattern contained in a cured plastic material, preferably a cured epoxy resin.

It is preferred that the master diffractive optic pattern be provided on a substrate. The combination of master diffractive optic pattern and substrate may be those commercially available or may be a submaster prepared from the master by the embossing process of the invention or some other process. The substrate of a commercial master diffractive grating is generally a glass substrate having a diffractive pattern thereon, however, the nature of the substrate is not critical and may be any of various materials including ceramic, polymer or metal material. The diffractive pattern may further be provided with a thin metal coating. The coating must be sufficiently thin so as to avoid filling in or significantly diluting, the periodicity or shape of the diffractive optic pattern. Preferably, the metal coating is <1000 Å thick, particularly from 20 to 100 Å thick. The preferred metal coating is an aluminum coating, but, other metals which provide surface hydroxyl groups may be used such as silver, platinum or gold. The metal layer is applied to the surface of the diffractive optic pattern preferably by vapor phase deposition. Similarly, a layer of semiconductor material, such as Si or inorganic glass such as SiO or $SiO_2$ may be used as a layer.

The diffractive optic pattern is not particularly limited. In the preferred embodiment it is a diffractive grating useful for the coupling in or out of light to or from a waveguide. They may have various grating profiles of different line spacing and groove shape, for example, sinusoidal or triangular. Examples of such diffractive gratings include 1200 lines/mm and 2400 lines/mm gratings. However, spacing of a single line of submicron width up to 3600 lines/mm could be used. Thus, the method may be used for embossing channels or single ridges which are not necessarily considered diffractive optical patterns.

Preferably a submaster of the master diffractive optic pattern is prepared and the submaster used for the embossing process. The submaster itself can be prepared by the embossing process of the invention by applying the fluorinated silane release layer to the master diffractive optic, applying the curable plastic to another substrate, pressing the master diffractive optic pattern onto the plastic to emboss the pattern therein, curing the plastic and providing a metal layer over the embossed pattern on the cured plastic. Then the fluorinated silane release layer is provided on the metal layer resulting in a new master, i.e., a submaster, for the embossing process. In this way the original master diffraction pattern can be preserved and used for preparing other identical submasters, if necessary. The substrate for the submaster is preferably glass, but, again may be other materials such as ceramic, polymer or metal.

The release layer is provided on the master or submaster by coating with a fluorinated silane to provide a thin layer thereon. The layer must be sufficiently thin so as not to significantly fill in the surface variations of the diffraction pattern. Accordingly, the fluorinated silane layer should be provided in a thickness ranging from a molecular monolayer of about 5 Å to up to about 1000 Å, particularly from 20 Å to 100 Å, depending on the nature of the diffraction grating pattern and the presence or absence of a metal layer. Such a thin layer of the fluorinated silane is preferably provided by vapor deposition techniques. Although, transfer of a compact monolayer to a metal or glass surface by Langmuir-Blodcett techniques could also be used. Methods for vapor deposition of fluorinated silanes are known in the art or can be provided analogous to known methods. For example, vapor phase solutions of 0.1 to 10% (v/v) are provided, and the master or submaster elevated above the solution so that the vapors derivitize the surface to provide the layer.

The silane groups of the fluorinated silanes react with oxide groups on either the substrate surface having the diffractive optics pattern thereon or the metal layer coated thereover to provide a relatively strong covalent bond of the release layer to the master or submaster. For example, with a glass substrate, the silane forms an —Si—O—Si— bond with the silicon oxides of the glass. Thus, when the master or submaster is not coated with a metal layer the substrate should be selected to provide suitable oxide groups for bonding with the silane functions of the release layer. Similarly, when using a metal layer, the metal must be selected to provide suitable oxide groups. Aluminum is the preferred metal layer because it readily provides surface hydroxyl groups. This is also why, when the submaster is prepared by embossing in an epoxy resin, a metal layer is provided thereover having oxide groups. As a result of bonding to the master or submaster diffractive pattern or metal layer surface thereon, the release layer is not removed during the embossing process and can be reused many times.

The fluorinated silanes preferably are those having at least three carbon atoms up to polymeric fluorinated silanes, such as TEFLON®. However, the lower molecular weight fluorinated silanes are preferred, i.e. those with 3 to 20, particularly 3–12, carbon atoms. The fluorinated silane contains at least one, preferably one to three, alkoxy or halide group(s) bonded directly to the Si atom of the silane capable of reacting with oxide groups on the substrate or metal layer to form the bond thereto as discussed above. Further, the silanes contain at least one fluorinated alkyl group bonded to the Si atom of the silane. Preferably the fluorinated alkyl group(s) have at least half of their hydrogen atoms replaced with fluorine atoms up to being perfluorinated. For instance, monomeric silanes useful herein include those of the following formula:

$$Si(R^1)_a(OR^2)_b(X)_c$$

where $R^1$ is fluorinated alkyl group, preferably of 3–20 carbon atoms, $R^2$ is an alkyl group, preferably of 1–4 carbon atoms, more particularly 1 or 2 carbon atoms, X is a halogen group, a+b+c=4, a≧1 and b+c≧1. However, silanes with multiple Si atoms may also be used ranging up to polymeric fluorinated silanes such as TEFLON®. When the fluorinated silanes are monofunctional, i.e. having only one alkoxysilane or halide silane group, a monolayer of such silanes will be formed on the substrate surface or metal layer surface. If the silane is multifunctional, particularly trifunctional, the silanes will not only bond to the substrate or metal layer but also crosslink amongst themselves in which case a thicker and more strongly adhered layer will be provided. Thus, trifunctional silanes, for example (tridecafluoro-1,1,2,2-tetrahydrooctyl)-1,1-trichlorosilane, may be preferred for some applications.

The curable plastic used for pressing against the master or submaster having the fluorinated silane layer thereon to emboss the diffraction pattern therein may be any curable plastic suitable for this purpose. For example, which cures or hardens to a material which does not cause significant attenuation of the incident source, such as being transparent. Preferably, the curable plastic is a curable epoxy resin. Also preferably, the plastic is a UV-curable resin, although resins curable by heat or two-part curable resins may also be used. When a UV-curable resin is used it is preferable that the substrate of the master or submaster and/or the substrate of the embossed product be of UV transparent material so that the resin can be cured by UV light transmitted therethrough. Particularly preferred UV-curable epoxy resins are commercially available or preparable by methods know or analogous thereto. For example, UV-curable epoxy No. 81 from Norland Products Inc. (New Brunswick, N.J.) is useful herein.

Like the substrate for the master or submaster, the substrate for the product is generally a glass substrate, however, it may also be selected from any of various other materials including ceramic, polymer or metal material. In a particularly preferred embodiment, the substrate of the product-is a waveguide, especially a planar waveguide, and the embossed diffraction grating provided thereon by the process facilitates the coupling in or out of light to or from the waveguide.

In an alternate embodiment, further described in the Examples below relating to a specific embodiment for silicon nitride waveguides, the substrate for the product is another master or submaster containing a diffractive optic pattern thereon and a fluorinated silane release layer so that the product is a cured plastic resin having an embossed diffractive optic pattern on both sides.

Another alternate embodiment can be used to prepare polymer waveguides. Therein, a submaster prepared as described above with a fluorinated silane release layer thereon is coated with a thin metal layer in a manner analogous to that described above. Then, the metal layer coated submaster is pressed onto a curable plastic on a substrate to emboss the diffractive optic pattern therein. After curing of the plastic, the substrate is separated with the metal layer released from the submaster and adhered to the cured plastic. A polymer waveguide is then spun over the metallized diffraction grating in a manner known in the art to provide a polymer waveguide.

The invention can be used to provide diffractive optics on a wide variety of substrates in an inexpensive and reproducible manner. For example, the invention can be used to provide gratings on waveguides, couplers, narrow-band filters, beam splitters, focusing elements and even on bulk optics to provide a diffraction effect when desired. Thus, the invention can be used in place of more expensive and non-reproducible holographic or lithographic means. The invention is also applicable to any embossed structure requiring a template, i.e. channels, or steps.

Particularly, the invention is useful for application to planar optical waveguides which are used in analytical and chemical detection methods. For example, such devices can be used for bio/chemical sensors, attenuation, fluorescence and interferometric sensors, enhanced Raman spectroscopy, pH measurement and blood chemistry analysis. The ability to produce the inventive waveguides with the coupling diffraction gratings in an inexpensive and reproducible manner makes single-use versions of sensors for such applications more feasible. Further, the invention is useful for the reproduction of useful diffractive optics or other patterns.

The entire disclosure of all applications, patents and publications, cited above and below, and also of the entire article of *Analytical Chemistry*, Vol. 68, No. 7, pp. 1245–49, is hereby incorporated by reference.

Figure 1A:
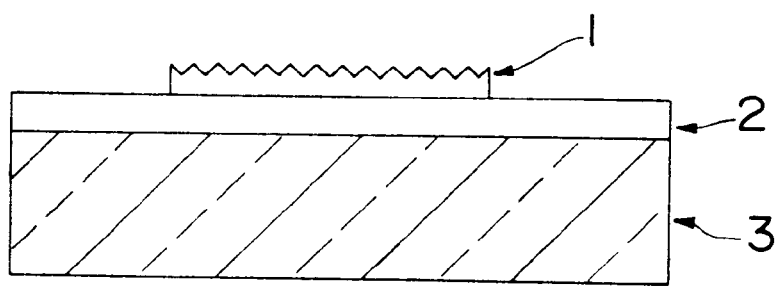
FIG. 1(A) depicts a step index or ion-diffused waveguide embossed with a diffractive grating according to the invention.

In the foregoing and in the following examples, all temperatures are set forth uncorrected in degrees Celsius; and, unless otherwise indicated, all parts and percentages are by weight.

EXAMPLES

Examples
Reagents and Materials

UV curable epoxy, No. 81, was obtained from Norland Products Inc. (New Brunswick, N.J.). No. 81 was chosen for its rapid curing rate, high transparency between 400 and 3000 nm, and refractive index of 1.56. Reflection gratings (1200 line/mm, 17° 27' blaze angle) and glass prisms (Schott glass SF-2, $\eta_d=1.644$) were purchased from Edmund Scientific (Barrington N.J.). Cubic zirconia prisms (Lot No. PRE 0302, $\eta_d=2.158$) were purchased from Precomp (Great Neck, N.Y.). Microscope slides were obtained from Erie Scientific (Portsmouth, N.H.) and Kimble (Toledo, Ohio). Polystyrene (MW=280 000, lot No. 00320EF) was purchased from Aldrich (Milwaukee, Wis.). (Tri-decafluoro-1, 1,2,2-tetrahydrooctyl)-1-trichlorosilane was from Petrarch Systems (Bristol, Pa.). Sodium nitrate, silver nitrate, ammonium hydroxide, and, hydrogen peroxide were all of reagent grade. All materials were used as received.

Instrumentation

The UV source (365 nm) used to cure the epoxy gratings was from Spectroline, Model enf-260c, 115 V, 60 Hz, 0.20 A (Spectronics Corp., Westbury, N.Y.). Waveguide characterization was performed on a Metricon Model 2010 Prism Coupler (Metricon Corp., Pennington, N.J.). Measurements obtained in the laboratory employed a 5 mW, linearly polarized HeNe laser (Uniphase, Monteca, Calif.) and a photodiode detector (PIN-10D type, Model 818-SL Newport Corp., Irvine, Calif.) with a transimpedance amplifier (Model 101C, United Detector Technology, Hawthorne, Calif.). Interference measurements for polystyrene waveguides were obtained with a UV-vis 260 spectrophotometer (Shimadzu, Kyoto, Japan). The spin-coater was constructed in-house using a variable speed HST110 motor controller (G. K Heller Corp., Floral Park, N.Y.).

Preparation of Waveguides

Green float glass waveguides were obtained as microscope slides from Erie Scientific. Glasses fabricated by the float process commonly have tin oxides incorporated into the surface. The presence of the oxide layer increases the refractive index at the surface of the glass substrate, resulting in a layer that supports one or more guided modes. Silver ion diffused waveguides were fabricated by immersing clean microscope slides (Kimble) in a 0.25 wt % $AgNO_3/NaNO_3$ solution at 320° C. for 15 min. The guides were removed, cooled, and thoroughly rinsed in deionized $H_2O$. Any precipitated (reduced) silver was removed by wiping the surface with HNO$_3$. Polystyrene waveguides were fabricated by spin-coating. A clean microscope slide was flooded with a 50 mg/g solution of polystyrene in toluene that was previously filtered with a 0.2 µm stainless steel frit. Excess polymer solution was spun off, and the film was formed by spinning at 2000 rpm for 1 min. The resulting waveguides were allowed to dry in the presence of toluene vapors for 1 day before use. Silicon nitride waveguides were fabricated in-house using standard silicon foundry procedures. A 1.8 µm thick SiO$_2$ buffer layer was grown on a 3 in. p-type silicon wafer with a (111) orientation. Dichlorosilane was reacted with a stoichiometric excess of ammonia in a low-pressure chemical vapor deposition (LPCVD) process at 750° C. to form silicon nitride layers between 1200 and 3400 Å thick on top of the oxidized buffer layer. These wafers were then annealed at 1000 ° C. for 60 min in flowing nitrogen. Following the first annealing step, a 1400 Å layer of low-temperature oxide (SiO$_2$) was deposited on the Si$_3$N$_4$ waveguide. The final annealing step was performed at 1000° C. for 45 min in flowing nitrogen.

Fabrication of Embossed Gratings. Ion-Diffused and Step Index Wave-guides.

Commercial gratings were silanized from vapor phase with a 1% (v/v) solution of (tridecafluoro-1,1,2,2,-tetrahydrooctyl)-1,1-trichlorosilane in toluene at 50° C. for 35 min. The gratings were allowed to dry at room temperature for several hours. Embossed gratings were fabricated by placing a small drop of UV curable epoxy onto the waveguide surface and pressing the epoxy drop onto the silanized master grating. Referring to FIG. 1A, for thin (0.1–2 mm) glass substrate (3), it is possible to cure the epoxy through the substrate with a UV lamp. After a 1 min exposure, the glass substrate is pulled away from the release-coated master, leaving an embossed grating (1) on the waveguide surface (2). This procedure was used to fabricate gratings on float glass and ion-diffused and step index waveguides.

Submasters

To preserve the commercial (master) gratings, all waveguide gratings were embossed from copies of the master grating known as "submaster" (SM) gratings. The submaster was formed by first embossing a large (12 mm diameter) epoxy grating onto a glass substrate, which was subsequently aluminized (~100 nm) by vacuum deposition. The aluminized grating was then silanized with the trichlorosilane release reagent described above. Embossed gratings were then fabricated as described above. Gratings prepared from the SM exhibited diffraction efficiencies identical to those exhibited by gratings prepared directly from the commercial master.

Polymer Waveguides

Figure 1B:
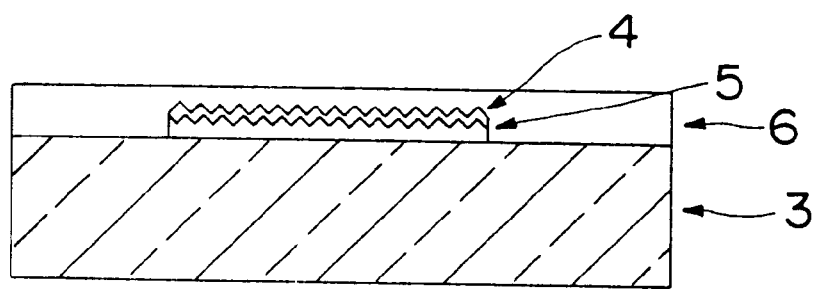
FIG. 1(B) depicts a polymer waveguide embossed with a diffractive grating according to an alternate embodiment of the invention.

Referring to FIG. 1(B), gratings were prepared by evaporating a thin (~100 nm) coat of aluminum (4) on a SM grating. The coated SM was then pressed onto a small drop (<1 µL) of epoxy placed onto the substrate as previously described. After exposure, the SM was removed, leaving an ~0.6 cm$^2$ aluminized grating (5) embossed onto the glass substrate (3). The polymer waveguide (6) was then spun over this replica grating.

Silicon Nitride and High Refractive Index Waveguides

Figure 1C:
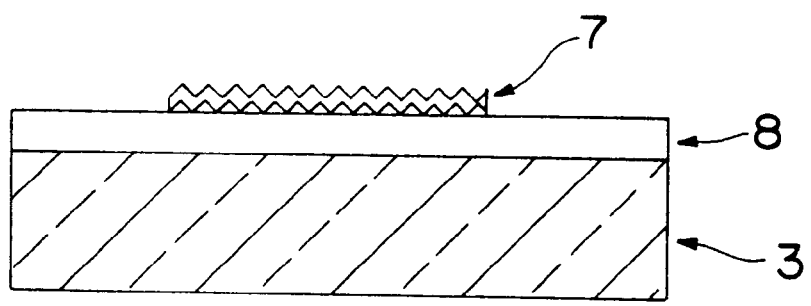
FIG. 1(C) depicts a silicon nitride or other high refractive index waveguide embossed with a diffractive grating according to a further alternate embodiment of the invention.

Referring to FIG. 1(C), grating fabrication for Si$_3$N$_4$ and high refractive index waveguides employs two SM gratings which have been aluminized and silanized. A drop of epoxy is sandwiched between the two SM gratings and exposed to UV. The SM gratings are pulled apart, leaving the embossed grating gently adhered to one of the SM grating surfaces. The grating produced by this method is double-sided (7) (grating profile on each side). It is transferred to the silicon nitride waveguide (8) by pressing the waveguide against the grating and lifting it from the SM surface. Alternatively, 2400 line/mm gratings can be used in the normal embossing orientation to couple directly into these high-index waveguides. When 1200 line/mm grating are used for guides with a refractive index above 1.8, the coupling must be accomplished through a cladding (see below). If, however, a 2400 line/mm grating is used, normal grating fabrication as described above can be performed.

Characterization of Embossed Gratings. Scanning Electron Micrographs

SEM of the top of an embossed gratings prepared above, show a regular periodic structure is obtained that lacks any significant defects. The groove spacing and blaze angle closely match the values reported for the master gratings (0.83 µm, 17° 27'). Micrographs obtained for cross sections of the grating reveal that only the surface of the epoxy drop is embossed with periodic groove structure; the —unmodulated portion of the epoxy grating is 17 µm thick, while the modulated portion groove depth is equal to 0.2 µm.

Diffraction Efficiencies

Figure 2:
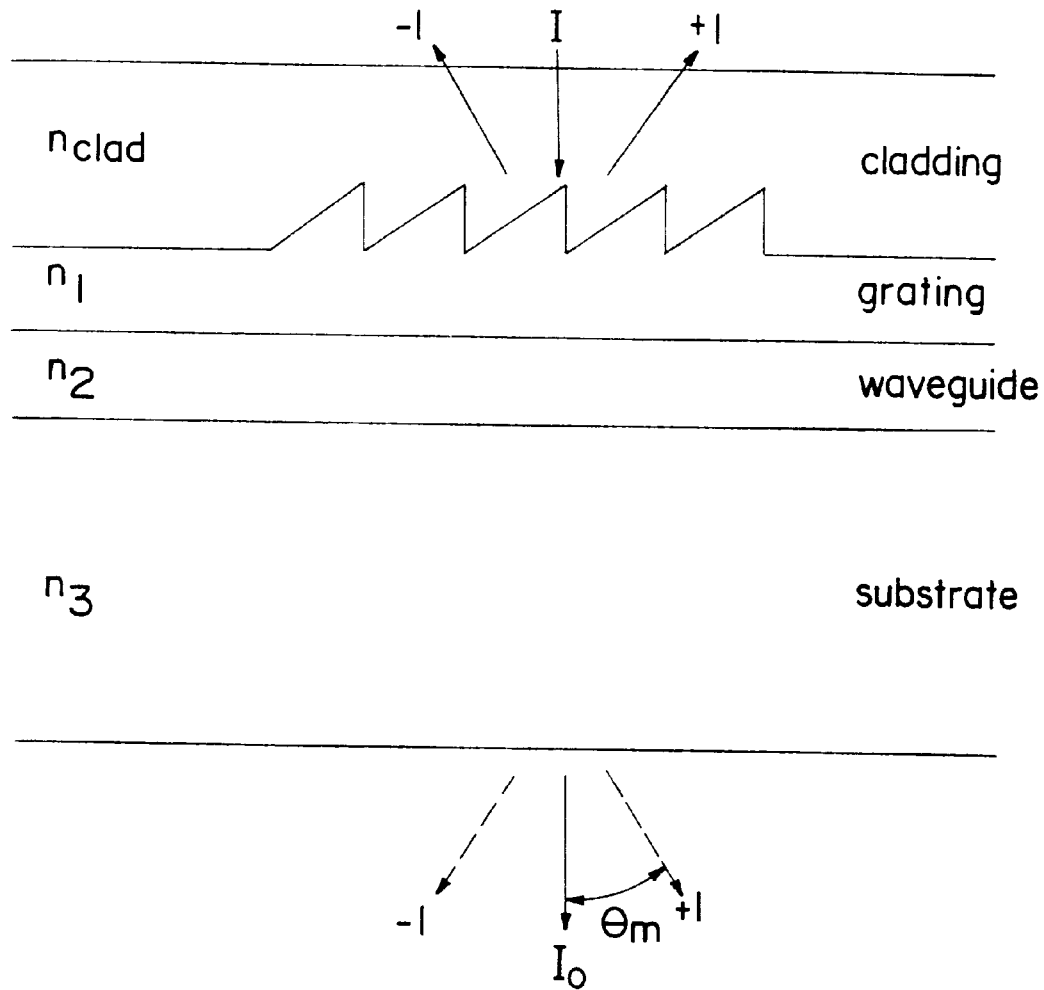
FIG. 2 depicts the diffracted orders from an embossed epoxy transmission grating onto the top of a waveguide for $\theta_i=0°$.

A beam incident upon a grating is diffracted into one or more orders following the relation:

$$d(\sin\theta_i - \sin\theta_m) = m\lambda, m = 0, \pm 1, 2, 3, \ldots \quad (2)$$

where d is the grating period, $\theta_i$ is the angle of the incident light, $\theta_m$ is the angle of the diffracted light, and m is the order of diffraction, as illustrated in FIG. 2. The general quality of the embossed gratings could be assessed in situ (on the waveguide) by measuring the efficiency of diffraction into the first-order transmission mode with a normal incidence beam. The diffraction efficiency for the m=+1 transmitted order of 10 replicate 1200 lines/mm, 500 nm blazed, embossed gratings was determined to be 4.59% (u$_t$=0.10%) at 633 nm with an incidence angle of 0°. This diffraction efficiency was obtained as the ratio of the intensity of the m=+1 transmitted order to the initial beam intensity incident upon the grating, corrected for the front surface fresnel reflection loss. The total diffraction efficiency of all orders, +1 transmitted and reflected, was determined to be 13.01% (u$_t$=0.54%). By way of comparison, the diffraction efficiency of a 1200 lines/mm embossed copy of a holographic grating (sinusoidal profile) was about 4.8% for m=1 at an incidence angle of 0°.

Grating Coupler Throughput Efficiency

The conditions for phase-matched grating coupling into a waveguide are well known:

$$\beta = \kappa_0 N_c \sin\theta_i + m 2\pi/d$$

where $\beta = \kappa_0 N_{eff} = \kappa_0 N_w \sin\theta_w$, $\kappa_0 = 2\pi/\lambda d$, $N_c$ is the refractive index of the cladding, $\theta_i$ is the incidence angle of the beam through the cladding, m is the diffraction order, d is the grating period (1200 line/mm, d=0.833,um), Nw is the waveguide refractive index, $\theta_w$ is the angle of beam propagation in the waveguide, and d is the grating period. Coupling efficiencies (for the m=+1 order) for float glass waveguides using grating in-and out-coupling were measured for both substrate and superstrate (air) coupling. The highest efficiency for grating coupling is usually obtained with the laser incident from the superstrate when the grating is on top of the waveguide, as in the case of float glass and Ag+waveguides. The throughput for superstrate coupling was 0.54% ($\mu_t$=0.17%) for eight waveguides, while substrate coupling throughput was 0.43% ($\mu_t$=0.06%) for the same sample set. The throughput efficiencies for the +1 order include input and output coupling loss, waveguide loss for the 2 cm path length, and diffraction efficiency of the grating. The total optical throughput found in this study is comparable to those reported in the literature for grating couplers formed by photolithographic techniques.

Similar results were obtained for the Ag$^+$-diffused waveguides, with throughput efficiencies of 0.26% ($u_i$= 0.08%) for four samples measured for the +1 order into mode 0 with superstrate coupling. With polystyrene waveguides, however, adhesion of the embossed epoxy grating and the polystyrene film was not uniform, and coupling was extremely inefficient. Gratings embossed onto the glass substrates and then overcoated with the spun polymer waveguide also failed to show any significant coupling. In an attempt to enhance the coupling efficiency, a buried aluminized grating was fabricated between the spun polystyrene waveguide and the glass substrate. As previously described (FIG. 1B), the gratings were coated with an aluminum reflection layer, over which the polymer guide was spun. After this modification, waveguides modes were observed in the polystyrene waveguide with throughput efficiencies of 1.12% ($u_i$=0.14%) for the +1 order (mode 0, with superstrate coupling, n=5). Although the 1.12% throughput efficiency obtained with grating couplers is lower than that seen with prisms, the throughput reproducibility is significantly enhanced.

Input coupling was not observed for 1200 lines/mm gratings embossed onto the Si$_3$N$_4$ waveguides in the normal orientation, as the groove period is limited to coupling into effective indexes below 1.76. As mode 0 has an effective index of 1.895, either a higher frequency grating is required, or the incident beam must be launched through a cladding. Launching the beam through a cladding can be accomplished by "flipping" the grating upside down onto the waveguide surface, as depicted in FIG. 1C. After this modification, waveguide modes were observed in the silicon nitride waveguide with a throughput efficiency of ~0.2% for the +1 order. Although this procedure yields a double-sided grating, this did not appreciably affect the coupling angles, and recent work suggests that more efficient coupling may result with properly designed double-sided gratings. Waveguiding was observed with directly embossed single-sided 2400 lines/mm gratings; however, the coupling was so weak that no outcoupled beam was readily measured.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An optical element having a diffractive optic pattern embossed in a cured plastic material without a metal layer on the pattern, prepared by embossing a diffractive optic pattern into a curable plastic material by pressing against the curable plastic material a master having a diffractive optic pattern thereon, said master having a release layer coating of a fluorinated silane in a thickness ranging from a molecular monolayer to up to about 1000 Å, said silane having at least one fluorinated alkyl group bonded to an Si atom and at least one alkoxy or halide group bonded to an Si atom.

2. The element of claim 1, wherein the fluorinated silane layer is applied by vapor phase deposition.

3. The element of claim 1, wherein the preparation further comprises curing the plastic and releasing the cured plastic containing the diffractive optic pattern embossed therein from the master.

4. The element of claim 3, wherein the plastic is a thermoplastic and is cured by UV light.

5. The element of claim 1, wherein the curable plastic is an epoxy resin.

6. The element of claim 1, wherein the curable plastic is provided on a substrate and cured thereon.

7. The element of claim 6, wherein the substrate is a glass substrate.

8. The element of claim 6, wherein the substrate is a waveguide.

9. The element of claim 6, wherein the substrate is a planar waveguide.

10. The element of claim 1, wherein the fluorinated silane is of the following formula:

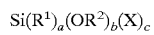

where R$^1$ is fluorinated alkyl group, R$^2$ is an alkyl group, X is a halogen group, a+b+c=4, a≧1 and b+c≧1.

11. The element of claim 1, wherein the fluorinated silane contains three halide and/or alkoxy groups bonded to an Si atom.

12. The element of claim 1, wherein the layer of fluorinated silane has a thickness of 20 to 100 Å.

13. The element of claim 1, which further comprises an additional diffractive optic pattern embossed into an opposing side of the curable plastic material by pressing against the curable thermoplastic material another master having a diffractive optic pattern thereon which is coated with a thin layer of a fluorinated silane, having at least one fluorinated alkyl group bonded to an Si atom and at least one alkoxy or halide group bonded to an Si atom, as a release layer to obtain a thermoplastic material containing two diffractive optic patterns on opposing sides.

14. The element of claim 13, wherein the plastic material containing two diffractive optic patterns on opposing sides is provided on a silicon nitride waveguide.

15. The element of claim 1, wherein the diffractive optic pattern is a diffraction grating of 1 to 3600 lines/mm.

16. The element of claim 1, wherein the fluorinated silane has only one alkoxy or halide group bonded to an Si atom and forms a release layer coating having a molecular monolayer thickness.

* * * * *